Figure 1:
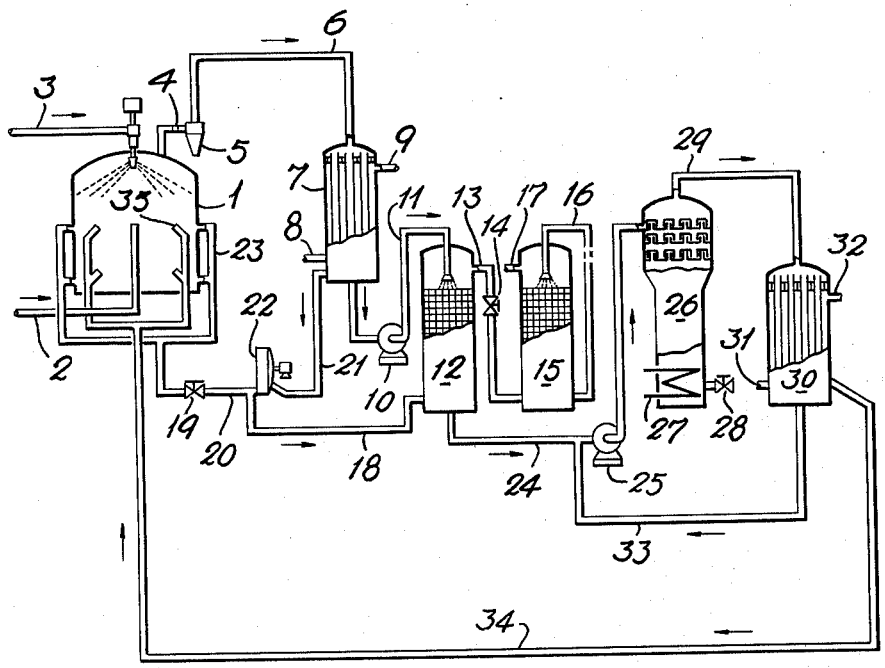

United States Patent Office
3,214,260
Patented Oct. 26, 1965

3,214,260
PRODUCTION OF HIGH GRADE COMPLEX FERTILIZERS CONTAINING DIAMMONIUM PHOSPHATE AS A PRINCIPAL COMPONENT
Yasumaro Oi, Chuo-ku, Tokyo, and Sekio Kusanagi, Rokuro Hoki, and Mitsuo Arata, Nei-gun, Toyamaken, Japan, assignors to Nissan Chemical Industries, Ltd., Tokyo, Japan, a corporation of Japan
Filed June 18, 1962, Ser. No. 203,182
Claims priority, application Japan, June 23, 1961, 36/21,918, 36/21,919
4 Claims. (Cl. 71—41)

The present invention relates to a process for the production of ammonium salts, and more particularly to a process wherein ammonium salts are produced by reactions of acidic solutions with gaseous ammonia in a closed reaction chamber. The principal object of the invention is to provide an economical process for the production of high grade complex fertilizers containing diammmonium phosphate as a principal component.

An "acidic solution" in the present description means an aqueous solution selected from the group consisting of sulphuric acid, phosphoric acid, nitric acid and mixtures thereof and these acidic solutions may be used with or without fertilizing salts, such as potassium salts, or agricultural chemicals.

As for the processes to manufacture ammonium salts in a dry form by a single step, whereby acidic solutions are reacted with gaseous ammonia in a closed chamber, several inventions have been heretofore proposed, for instance, such as those in U.S.P. 1,869,688, Brit. P. 383,278, Ital. P. 260,200, Ital. P. 270,502 and others. These processes, however, are not sufficient for the purpose of an economical manufacturing of complex fertilizers of every grade in a smooth way of operation. After several researches concerning the reaction in a closed chamber, the inventors have found that, in this type of reaction, the impure gases and inert gases, which were contained in the acidic solutions and gaseous ammonia, have been accumulated gradually in the reaction system and this phenomenon has caused the reduction in the partial pressure of ammonia in the reaction system, rendering the operation in an unstable condition and provoking fluctuations in qualities of the resultant products.

An object of the present invention is to provide a process wherein the best reacting condition is maintained in the manufacturing of high grade complex fertilizers by removing the inert gases so as to permit the reaction to proceed in a smooth way and at the same time excellent products are obtained.

In the next place, as the results of our research in respect to the mechanism of formation of diammonium phosphate, we have found that, in the aforementioned well-known processes, the partial pressure of ammonia in the reaction chamber and the particle diameter and the character of dispersion of finely divided liquid droplets have not been maintained in appropriate conditions for all of the cases. On account of this reason, it occurs that the proceeding of the reaction may become unstable and, at the same time, the degree of reaction is not complete and, moreover, there remains 1–2% of water in the resulting products. Under these circumstances, the reaction products sometimes have fallen down onto the bottom of the chamber, sticking together closely just like dumplings and, furthermore, it has occured that the continuous operation has become impossible from time to time.

Another object of the present invention is to provide a process for the manufacturing of high grade complex fertilizers, wherein the spraying system is ameliorated in such a way that products of constant quality can be produced in a good efficiency.

According to the process of the present invention, the major part of ammonia-containing effluent gas from the reaction chamber is returned to the reacting zone so as to control the operating pressure in the reaction chamber, while a portion of the said gas is drawn out from the reaction system, being absorbed in the condensate from the cooling condenser to form an enriched aqueous ammonia, and further the unabsorbed gas is scrubbed by means of sulphuric acid in the following absorption tower in order to recover the remaining ammonia, and after that it is released into the atmosphere. The aqueous ammonia thus obtained is rectified, whereby the fluorine-containing gas is transfered into the waste liquor, while the distilled gaseous ammonia is returned into the reaction chamber.

In the embodiment of the process according to the invention, the operation can be carried out in a stable state, by which the labor cost and consumption of raw materials have been reduced and, furthermore, it has been made possible to carry out the continuous operation for a long period.

Further, in manufacturing high grade complex fertilizers which contain diammonium phosphate as a principal component, the present invention has made it possible to maintain the partial pressure of ammonia in the reaction chamber at a relatviely high state and to keep the dispersion of the sprayed liquid particles in a uniform state, by minimizing the diameter of the said liquid particles as far as possible within the limit for avoiding the loss of liquid particles by the effluent gas. Owing to these ameliorations, it has become possible to avoid several faults which were found in the well-known processes.

Figure 2:
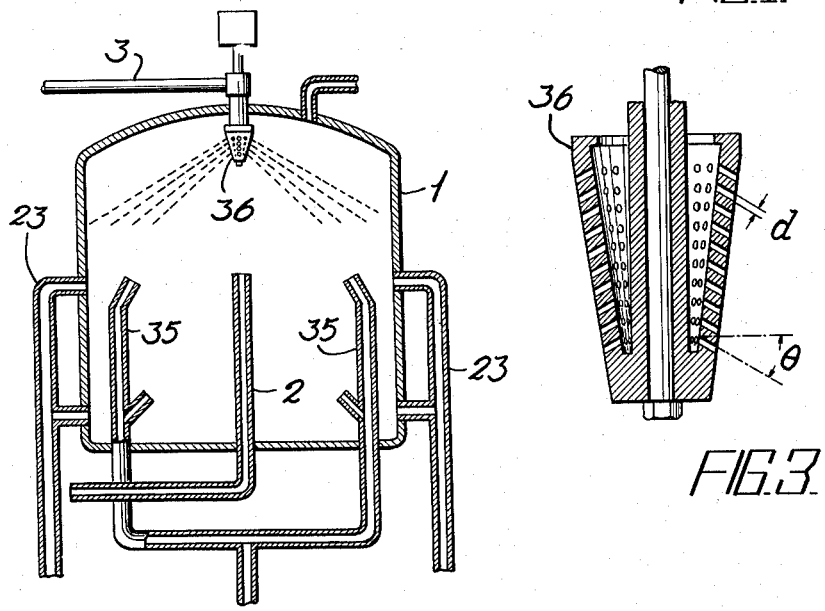
Figure 3:
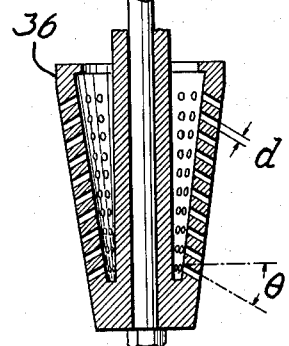

In the accompanying drawings, FIG. 1 illustrates one example of the complete arrangement of the apparatuses by which the process according to the present invention is practised, and FIG. 2 shows a longitudinal section of the reaction chamber used in the process according to the invention, and FIG. 3 shows one of the spraying nozzles provided at the top of the said reaction chamber.

With reference to FIG. 1, the process according to the present invention will be explained as follows.

In the reaction chamber 1, a phosphoric acid solution is sprayed through the conduit 3, while new charged gaseous ammonia is introduced therein through the gas inlet pipe 2 provided at the lower part thereof. The sprayed liquid particles of the phosphoric acid solution react with gaseous ammonia and, at the same time, the drying of the particles by evaporation is carried out, and thus they fall down onto the bottom of the chamber in a form of dry solid particle, having a moisture less than 0.5%. Excess gaseous ammonia is discharged from the top of the chamber, along with water vapour and inert gases as well as a small amount of fine particles. The partial pressure of ammonia in the reaction chamber 1 is controlled so that the concentration of ammonia in the effluent gas is in the range from about 30 to 50%. The stream of discharged gas is, after removal of fine particles in the dust collectors 4 and 5, introduced into the cooling condenser 7 by way of the conduit 6, wherein it is cooled to a temperature between 30° C. and 50° C. by means of water which comes in and out through conduits 8 and 9.

The stream of uncondensed gases, after passage through the conduit 21, circulating blower 22 is divided into two streams and the first stream containing about 80–90% of the uncondensed effluent gas in conduit 20, is introduced through the conduit 23 into the lower part of the reaction chamber 1. On the other hand, a second stream containing about 10–20% of the uncondensed effluent gas of the uncondensed gas is introduced into the absorption tower 12 through the branch pipe 18 by way of the conduit 20, and from the top of the tower a stream of 8–12% aqueous ammonia, which has been formed in the cooling condenser 7, is sprayed through the pipe 11 by means of the pump 10, so as to form 20% aqueous ammonia.

The stream of unabsorbed gases is introduced through the valve 14 on the conduit 13 into the absorbing tower 15, wherein sulphuric acid is sprayed through the conduit 16 to recover the remaining ammonia, and the inert gases are exhausted through 17 into the atmosphere. The soluble compounds containing fluorine are discharged with drain from the rectifying tower 26 through the discharge valve 28.

A stream of 20% ammonia aqueous solution is fed into the top part of the rectifying tower 26 through the conduit 24 by means of the pump 25.

The overhead gas, which has been evolved by heating with the heating pipe 27 provided at the bottom, is introduced into the aftercooler 30 through the conduit 29, wherein it is cooled with water coming in and out through the conduits 31 and 32, and then it is recycled into the reaction chamber through the conduits 34 and 35. The drain in the aftercooler is, after passage through the conduit 33, returned into the rectifying tower by means of the pump 25.

The operating pressure in the reaction chamber is automatically regulated at a pressure of ±10 mm. by water column.

In the process according to the present invention, the new additional ammonia, recycled ammonia and distilled ammonia are introduced into the reaction chamber separately, so as to keep the distribution of ammonia in the reaction chamber in a uniform state, and, accordingly, the volume of uncondensed gases, which should be purged into the absorption tower, is enough at a volume in the range from 10% to 20% of the total gas volume. The resultant product contains diammonium phosphate at a rate more than 85% and monoammonium phosphate at a rate less than 15%, while the operation can be carried out with a phosphoric acid solution, having a concentration of $P_2O_5$ at an extent of 40%.

Further, the manufacturing capacity in the reaction chamber can be increased remarkably, for instance, when the process according to the present invention was practised in an apparatus, which had a capacity of 150 t./day in case of a well-known process, the manufacturing capacity could be increased to the extent of 220 t./day.

The temperature in the reaction chamber should be kept at a temperature between 120° C. and 150° C., preferably at a temperature of about 130° C.

FIG. 2 shows the construction of the reaction chamber. Phosphoric acid, sulphuric acid and potassium salt are previously mixed in the determined proportions according to the composition of the product, and the liquid mixture is sprayed from the top part of the chamber. Gaseous ammonia is introduced into the chamber at a constant rate through the conduit 2 and the reaction takes place. In the spraying device 36, the diameter $d$ (FIG. 3) of nozzle 36 is maintained in the range from 1 mm. to 3 mm., while the spraying angle $\theta$ and the rotating frequency are kept in the ranges from 15° to 40° and from 1,000 r.p.m. to 3,000 r.p.m. respectively. When the operation is carried out within the aforementioned conditions, a product, which has a uniform quality and a moisture content from 0.2% to 0.5%, can be produced.

The examples according to the process of the present invention are as follows.

*Example 1*

By means of a spraying device, which has a nozzle-diameter of 2 mm., a spraying angle of 20° and a rotating frequency of 3,000 r.p.m., 1000 parts of a phosphoric acid solution for industrial use $P_2O_5=40\%$, $H_2SO_4=6.7\%$ being preheated at a temperature of 100° C., is sprayed as finely divided droplets into the reaction chamber.

230 parts of synthetic ammonia ($NH_3=99\%$), 300 parts of recycled ammonia ($NH_3=90\%$, $H_2O=5\%$ and 45° C.) and 92 parts of distilled ammonia ($NH_3=97\%$, $H_2O=3\%$, 30° C.) are introduced through the lower part of the reaction chamber, so as to react with the sprayed acidic solution.

The stream of effluent gas from the reaction chamber is recycled after being cooled to a temperature of 45° C. in the cooling condenser, while a portion (55 parts) of the said gas stream is introduced into the absorption tower, wherein it is absorbed in the drain from the cooling condenser so as to be recovered as 20% aqueous ammonia.

The absorbed ammonia is returned into the reaction chamber after passage through the rectifying tower. A resultant product of 820 parts is obtained, which contains 48.5% of $P_2O_5$ and 18.5% of N as $NH_3$.

*Example 2*

By means of a spraying device, which has a nozzle diameter of 2.5 mm., a spraying angle of 30° and a rotating frequency of 3,000 r.p.m., 1000 parts of a phosphoric acid solution for industrial use ($P_2O_5=18.5\%$, $H_2SO_4=43\%$), being preheated at a temperature of 100° C., is sprayed as finely divided droplets into the reaction chamber.

260 parts of synthetic ammonia ($NH_3=99\%$), 250 parts of recycled ammonia ($NH_3=90\%$, $H_2O=5\%$, 45° C.) and 95 parts of distilled ammonia ($NH_3=97\%$, $H_2O=3\%$, 30° C.) are introduced into the lower part of the reaction chamber.

The stream of effluent gas from the reaction chamber is recycled after being cooled to a temperature of 45° C. in a cooling condenser, while a portion (50 parts) of the said gas stream is introduced into the absorption tower, wherein it is absorbed in 445 parts of drain ($NH_3=10\%$) from the cooling condenser, so as to obtain 450 parts of 20% aqueous ammonia.

The absorbed ammonia is returned into the reaction chamber after passage through the rectifying tower.

A resultant product of 920 parts is obtained, which contains 20.07% of $P_2O_5$ and 21.0% of N as $NH_3$.

*Example 3*

437 parts of a phosphoric acid solution for industrial use ($P_2O_5=30\%$, $H_2SO_4=5\%$), 364 parts of 75% sulphuric acid and 178 parts of potassium sulphate ($K_2O=51\%$) are mixed and, after being preheated at a temperature of 100° C., the mixture is sprayed into the reaction chamber. In the spraying device being used, the nozzle diameter, the rotating frequency and the spraying angle are 3 mm., 1800 r.p.m. and 30° respectively. 160 parts of synthetic ammonia ($NH_3=99\%$), 250 parts of recycled ammonia ($NH_3=90\%$, $H_2O=5\%$) and 80 parts of distilled gas ($NH_3=97\%$, $H_2O=3\%$) are introduced separately into the lower part of the reaction chamber so as to react with the sprayed acidic solution at a temperature of 125–130° C.

The stream of effluent gas from the cooling condenser is recycled into the reaction chamber regulating the internal pressure, while a portion (43 parts) of the said stream is introduced into the absorption tower, wherein it is absorbed in 340 parts of drain ($NH_3=9\%$) from the cooling condenser so as to obtain 20% aqueous ammonia.

At the outlet of the reaction chamber, 21 parts of P.C.P. is mixed therein and thus 840 parts of granular product is obtained, which contains 15.4% of AN (available nitrogen), 15.5% of S.P. (soluble phosphate), 10.5% of WK (water soluble potassium) and 2.5% of P.C.P. (penta-chloro-phenol).

*Example 4*

508 parts of a phosphoric acid solution for industrial use, 264 parts of 91% sulphuric acid and 228 parts of potassium nitrate are mixed and, after preheating, the mixed liquor is sprayed into the reaction chamber. In the spraying device being used, the nozzle diameter, the spraying angle and the rotating frequency are 3.0 mm., 35° and 1,800 r.p.m., respectively.

156 parts of synthetic ammonia, 200 parts of recycled ammonia and 74 parts of distilled gas are introduced separately into the reaction chamber so as to react with the sprayed acidic solution at a temperature of 125–130° C.

The stream of effluent gas from the reaction chamber is returned to the reaction chamber after being cooled in the cooling condenser, while a portion (45 parts) of the gas is passed to the absorption tower so as to recover as aqueous ammonia.

A resultant product of 865 parts is obtained, which contains 18.5% of AN, 17.5% of SP and 12.1% of WK.

We claim:

1. A process for manufacturing a substantially dry high grade diammonium phosphate fertilizer, which comprises the steps of reacting gaseous ammonia with a sprayed phosphoric acid-containing solution in a closed reaction chamber to form a substantially dry reaction product, controlling the partial pressure of ammonia in the reaction chamber so that the concentration of ammonia in the effluent gas is in the range from about 30% to 50%, spraying said phosphoric acid-containing solution into said chamber through a spraying nozzle having a diameter in the range from 1 to 3 millimeters, a spraying angle in the range of from about 15° to 40° and a rotating frequency of about 1000 to 3000 r.p.m.'s so as to control the particle diameter of the sprayed solution and the character of its dispersion, venting the effluent gas from the reaction chamber, condensing water in the effluent gas in a condenser, separating dried effluent gas from the condenser into two streams, returning a first stream containing about 80 to 90 percent of the dried effluent gas into the reaction chamber, passing a second stream of the dried gas containing between about 10 to 20 percent of the dried effluent gas into an absorption zone and absorbing the same in condensate from said condenser to form an enriched aqueous ammonia, rectifying said enriched aqueous ammonia to recover ammonia gas, returning the recovered ammonia gas into the reaction chamber, and recovering the substantially dry reaction product from said reaction chamber.

2. A process as described in claim 1, wherein said phosphoric acid-containing solution also contains a potassium salt.

3. A process as described in claim 1, wherein the reaction product contains more than 85 percent diammonium phosphate and less than 0.5 percent water.

4. A process as described in claim 1, wherein the temperature in the reaction chamber is maintained in the range between 120° C. to 150° C.

References Cited by the Examiner

UNITED STATES PATENTS

| | | | |
|---|---|---|---|
| 2,921,837 | 1/60 | Helm | 23—107 |
| 2,965,470 | 12/60 | Ravazzi | 71—43 |
| 2,970,888 | 2/61 | Helm et al. | 71—64 |
| 3,006,725 | 10/61 | Henry | 23—107 |
| 3,008,801 | 11/61 | Adams | 71—43 |
| 3,063,802 | 11/62 | Maloy | 23—107 |
| 3,115,390 | 12/63 | Jadot | 71—41 |

DONALL H. SYLVESTER, *Primary Examiner.*

ANTHONY SCIAMANNA, *Examiner.*